(12) United States Patent
Yother

(10) Patent No.: US 6,827,324 B1
(45) Date of Patent: Dec. 7, 2004

(54) BAKED GOODS BAKING KIT

(75) Inventor: Paul D. Yother, Phoenix, AZ (US)

(73) Assignee: Paul Yother, Phoenix, AZ (US)

(*) Notice: Subject to any disclaimer, the term of this patent is extended or adjusted under 35 U.S.C. 154(b) by 135 days.

(21) Appl. No.: 10/367,928

(22) Filed: Feb. 19, 2003

(51) Int. Cl.⁷ .............................................. A21B 5/02
(52) U.S. Cl. ..................... 249/122; 249/176; 249/177; 249/DIG. 1; 99/428; 426/514
(58) Field of Search ................................ 249/119, 122, 249/124, 126, 176, 177, DIG. 1; 99/426, 428, DIG. 15; 426/512, 514

(56) References Cited

U.S. PATENT DOCUMENTS

| | | | |
|---|---|---|---|
| 55,734 A | | 6/1866 | Stillings |
| D35,475 S | | 12/1901 | Springer |
| 1,510,279 A | | 9/1924 | Huth et al. |
| 2,168,006 A | * | 8/1939 | Strietelmeier ................ 99/439 |
| 2,493,854 A | | 1/1950 | Brainard |
| 3,574,968 A | * | 4/1971 | Schlau et al. ................ 446/97 |
| 3,590,728 A | * | 7/1971 | Stanley ........................ 99/439 |
| 4,147,324 A | * | 4/1979 | Walter ........................ 249/170 |
| D253,332 S | | 11/1979 | Rich |
| 5,191,830 A | * | 3/1993 | Jacobson ..................... 99/439 |
| 5,400,698 A | * | 3/1995 | Savage ........................ 99/439 |
| 5,425,527 A | * | 6/1995 | Selbak ....................... 249/122 |
| 5,453,287 A | | 9/1995 | Close |
| 5,858,262 A | * | 1/1999 | Lebensfeld .................. 249/98 |
| 6,176,465 B1 | | 1/2001 | Cooper et al. |
| 6,231,910 B1 | | 5/2001 | Ellingsworth |

* cited by examiner

*Primary Examiner*—James P. Mackey
*Assistant Examiner*—Donald Heckenberg

(57) ABSTRACT

A baked goods baking kit for making cupcakes, in particular, having hollowed centers which can filled with filling of some sort. The baked goods baking kit includes a baking member having a main wall and also having a plurality of ornamental-shaped cup portions spacedly disposed in the main wall and being adapted to hold baking batter therein; and also includes a baking mold tool being detachably attached to the baking member for forming selected shapes in the baked goods being baked in the ornamental-shaped cup portions of the baking member.

6 Claims, 3 Drawing Sheets

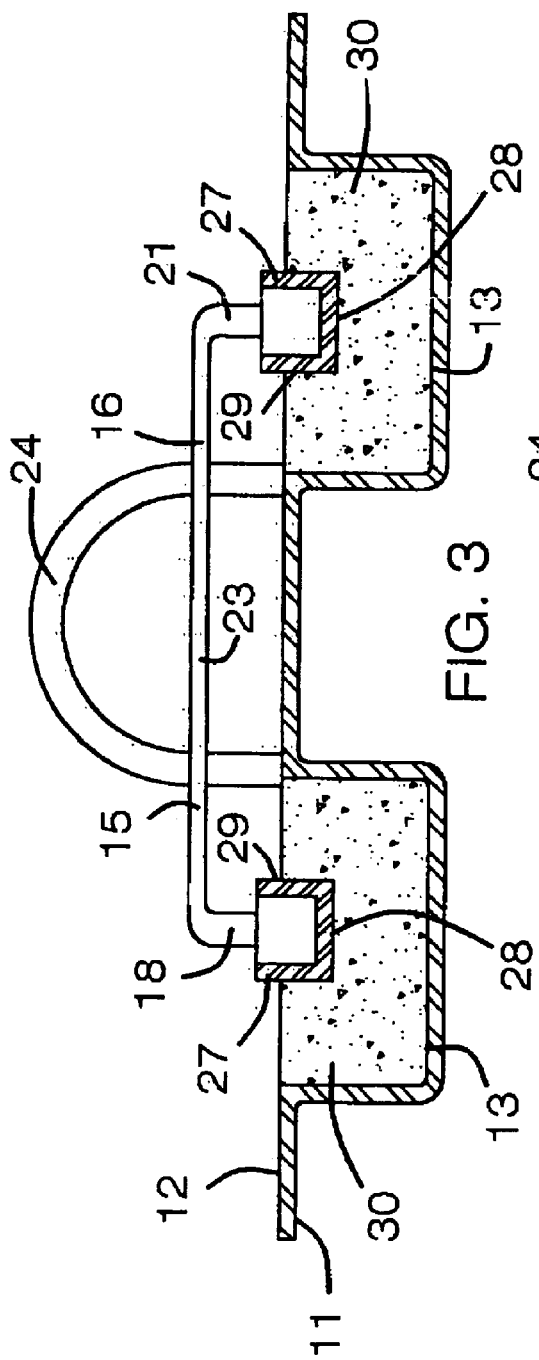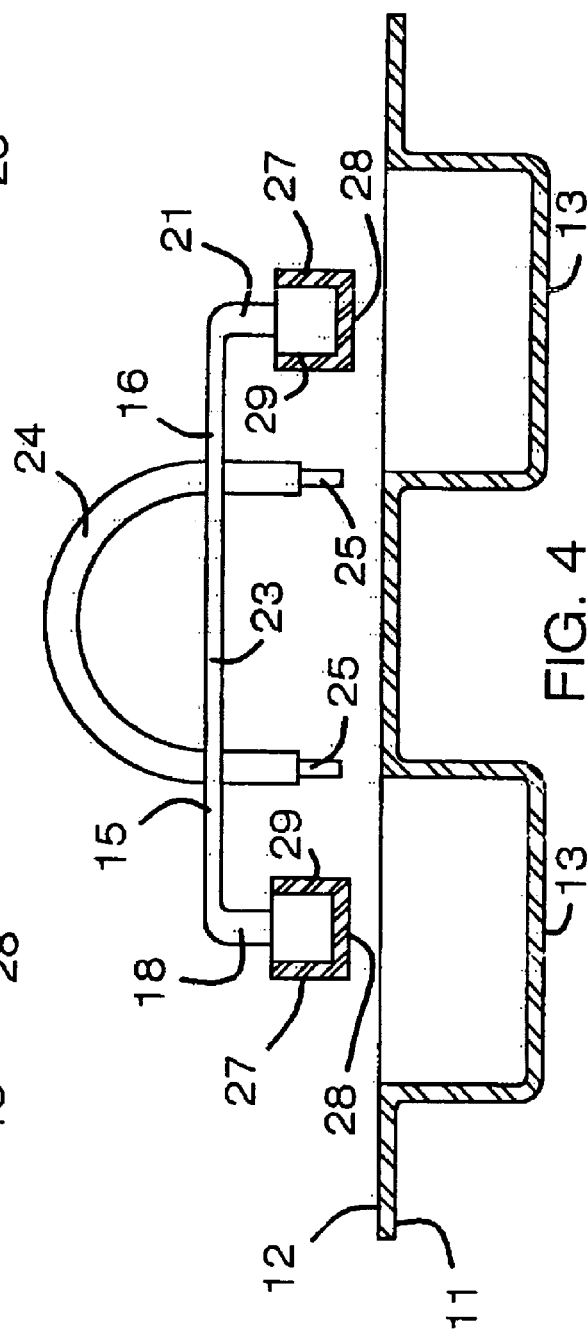

BAKED GOODS BAKING KIT

BACKGROUND OF THE INVENTION

1. Field of the Invention

The present invention relates to baking kits and more particularly pertains to a new baked goods baking kit for making cupcakes, in particular, having hollowed centers which can filled with filling of some sort.

2. Description of the Prior Art

The use of baking kits is known in the prior art. More specifically, baking kits heretofore devised and utilized are known to consist basically of familiar, expected and obvious structural configurations, nc withstanding the myriad of designs encompassed by the crowded prior art which have been developed for the fulfillment of countless objectives and requirements.

Known prior art includes U.S. Pat. No. 2,493,854; U.S. Pat. No. 6,231,910; U.S. Pat. No. 1,510,279; U.S. Pat. No. 6,176,465; U.S. Pat. No. 55,734; U.S. Pat. No. 35,475; U.S. Pat. No. 5,453,287; and U.S. Pat. No. Des. 253,332.

While these devices fulfill their respective, particular objectives and requirements, the aforementioned patents do not disclose a new baked goods baking kit. The prior art includes baking pans of various designs.

SUMMARY OF THE INVENTION

The general purpose of the present invention, which will be described subsequently in greater detail, is to provide a new baked goods baking kit which has many of the advantages of the baking kits mentioned heretofore and many novel features that result in a new baked goods baking kit which is not anticipated, rendered obvious, suggested, or even implied by any of the prior art baking kits, either alone or in any combination thereof. The present invention includes a baking member having a main wall and also having a plurality of ornamental-shaped cup portions being spacedly disposed in the main wall and being adapted to hold baking batter therein; and also includes a baking mold tool being detachably attached to the baking member for forming selected shapes in the baked goods being baked in the ornamental-shaped cup portions of the baking member. None of the prior art includes the combination of the elements of the present invention.

There has thus been outlined, rather broadly, the more important features of the baked goods baking kit in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new baked goods baking kit which has many of the advantages of the baking kits mentioned heretofore and many novel features that result in a new baked goods baking kit which is not anticipated, rendered obvious, suggested, or even implied by any of the prior art baking kits, either alone or in any combination thereof.

Still another object of the present invention is to provide a new baked goods baking kit for making cupcakes, in particular, having hollowed centers which can filled with filling of some sort.

Still yet another object of the present invention is to provide a new baked goods baking kit that is easy and convenient to set up and use.

Even still another object of the present invention is to provide a new baked goods baking kit that simplifies the process of making cupcakes with filing inside thereof.

These together with other objects of the invention, along with the various features of novelty which characterize the invention, are pointed out which particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention.

FIG. 4 is an exploded cross-sectional view of the present invention.

DESCRIPTION OF THE PREFERRED EMBODIMENT

Figure 1:
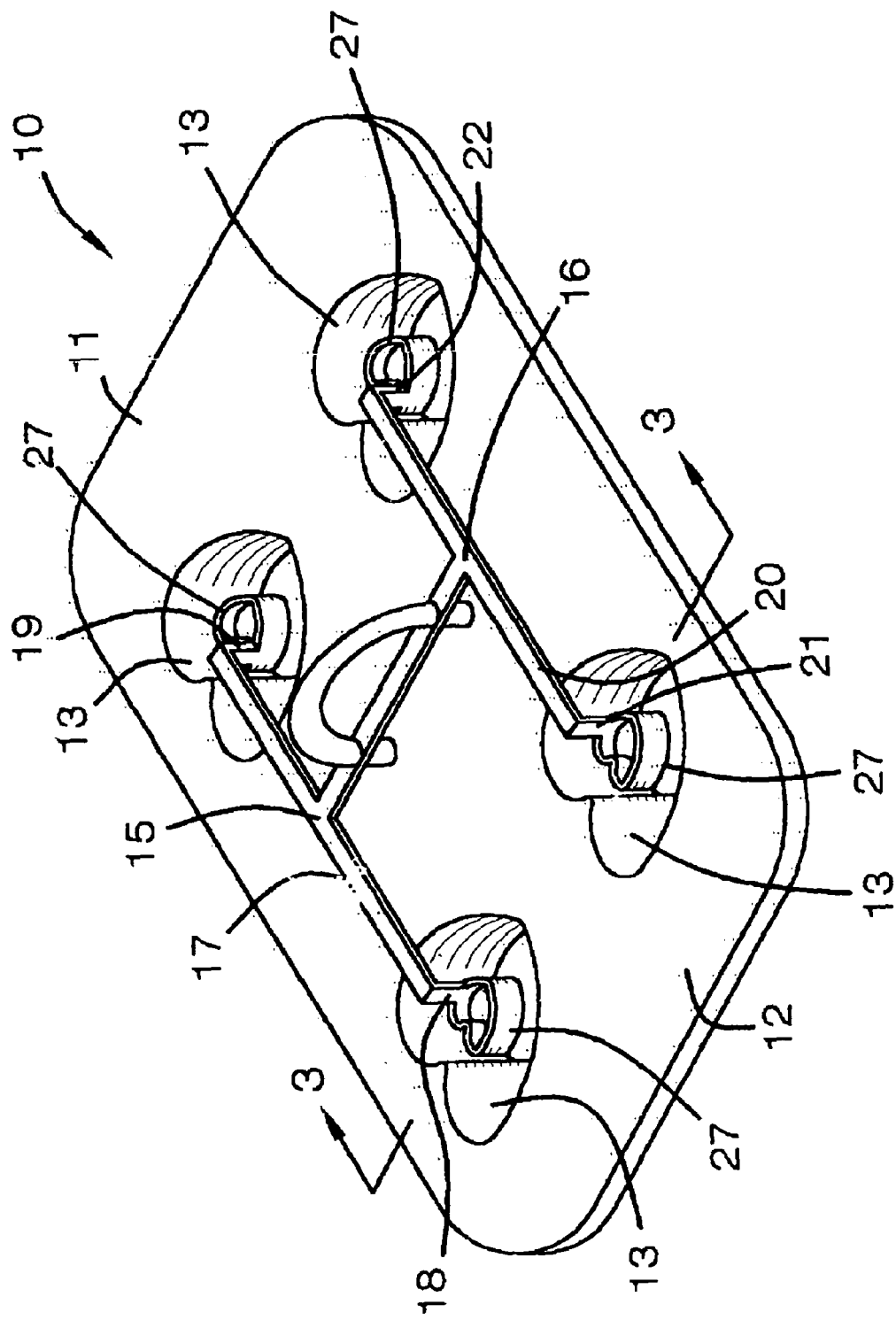
FIG. 1 is a top perspective view of a new baked goods baking kit according to the present invention.
Figure 2:
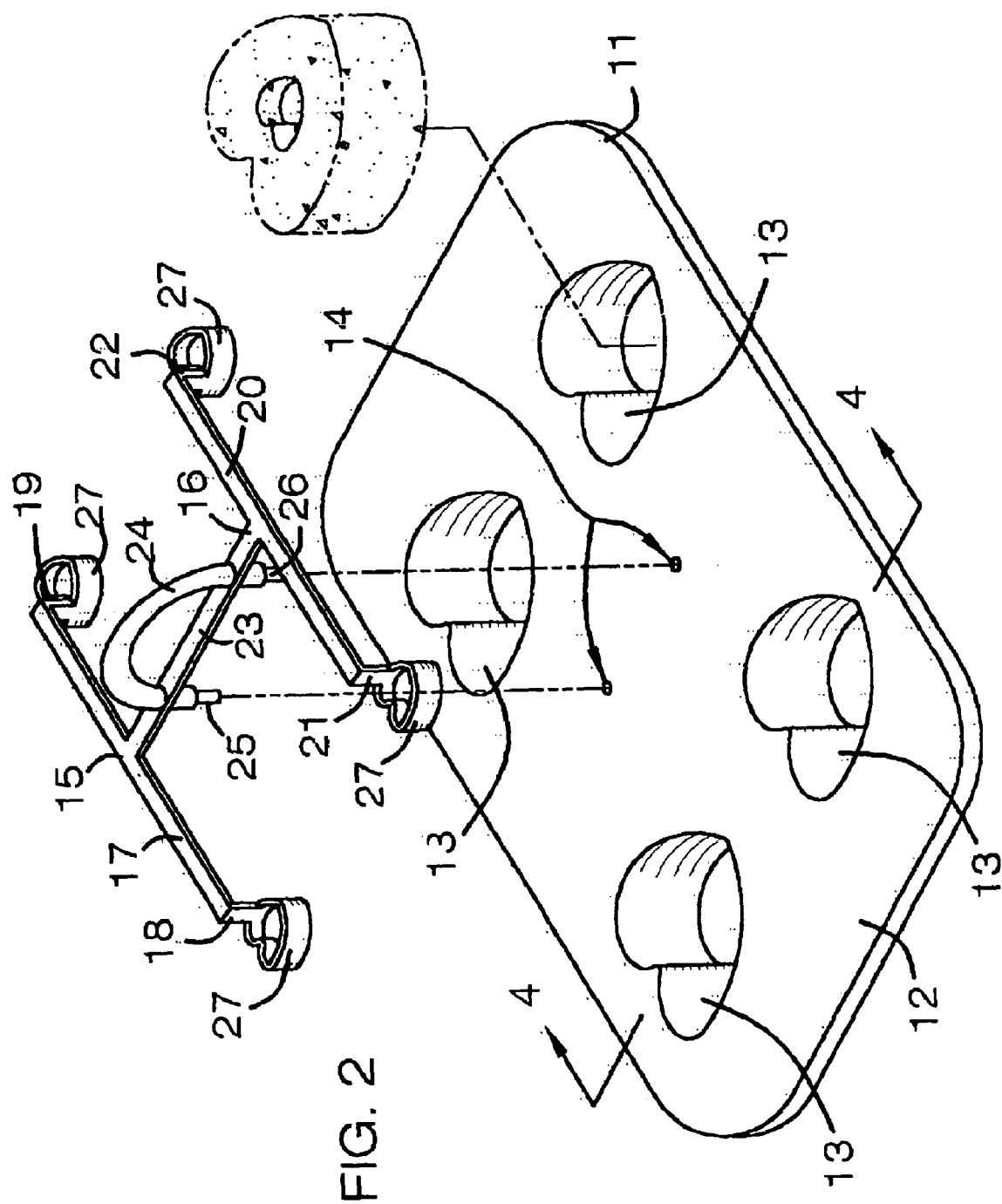
FIG. 2 is an exploded top perspective view of the present invention.

With reference now to the drawings, and in particular to FIGS. 1 through 4 thereof, a new baked goods baking kit embodying the principles and concepts of the present invention and generally designated by the reference numeral 10 will be described.

As best illustrated in FIGS. 1 through 4, the baked goods baking kit 10 generally comprises a baking member 11 having a main wall 12 and also having a plurality of ornamental-shaped cup portions 13 being spacedly disposed in the main wall 12 and being adapted to hold baking batter 30 therein. The baking member 11 further has holes 14 being centrally disposed in the main wall 12.

A baking mold tool 15 is detachably attached to the baking member 11 for forming selected shapes in the baked goods upon the baking batter 30 being baked in the ornamental-shaped cup portions 13 of the baking member 11. The baking mold tool 15 includes a frame 16, and also includes ornamental-shaped cup-like molds 27 being securely attached and welded to the frame 16, and further includes a handle 24 being securely attached to the frame 16, and also includes connectors 25,26 being securely attached to the frame 16 for holding the baking mold tool 15 to the baking member 11. The frame 16 includes elongate mold support members 17,20, and also includes an elongate cross member 23 securely interconnecting the elongate mold support members 17,20. Each of the elongate mold support members 17,20 has angled end portions 18,19,21,22 to which respective ornamental-shaped cup-like molds are securely attached and welded. The handle 24 has an arcuate shape and has end portions which are securely disposed through a top side of the elongate cross member 23. The connectors 25,26 are peg-like members extending from ends of the end portions of the handle 24 and being removably disposed in the holes 14 of the baking member 11 to hold the baking mold tool 15 to the baking member 11 and to secure the ornamental-shaped cup-like molds 27 in the ornamental-shaped cup portions 13. Each of the ornamental-shaped cup-like molds 27 has bottom and side walls 28,29 and is removably and centrally disposed in a respective ornamental-shaped cup portion 13 such that the baking batter 30 fills in the ornamental-shaped cup portion 13 about the ornamental-shaped cup-like mold 27 thus forming a cavity in the baked goods.

In use, the user secures the baking mold tool 15 to the baking member 11, and pours the baking batter 30 in the ornamental-shaped cup portions 13 and about the ornamental-shaped cup-like molds 27, and places the baking member 11 in the oven to bake the baking batter 30. Once the baking batter is baked to form baked good, the user removes the baking mold tool 15 from the baking member 11, and then removes the baked goods from the ornamental-shaped cup portions 13 with a cavity being disposed in the baked goods.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the baked goods baking kit. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baked goods baking kit comprising:
a baking member having a main wall and also having a plurality of ornamental-shaped cup portions being spacedly disposed in said main wall and being adapted to hold baking batter therein, said baking member further having holes being centrally disposed in said main wall; and
a baking mold tool being detachably attached to said baking member for forming selected shapes in the baked goods upon the baking batter being baked in said ornamental-shaped cup portions of said baking member, said baking mold tool including a frame, and also including ornamental-shaped cup-like molds being attached to said frame, and further including a handle being attached to said frame, and also including connectors being attached to said frame for holding said baking mold tool to said baking member, said frame including elongate mold support members, and also including an elongate cross member interconnecting said elongate mold support members.

2. The baked goods baking kit as described in claim 1, wherein said each of said elongate mold support members has angled end portions to which respective said ornamental-shaped cup-like molds are attached.

3. The baked goods baking kit is described in claim 2, wherein said handle has an arcuate shape and has cad portions which are disposed through a top side of said elongate cross member.

4. The baked goods baking kit as described in claim 3, wherein said connectors are peg-like members extending from ends of said end portions of said handle and being removably disposed in said holes of said baking member to hold said baking mold tool to said baking member and to secure said ornamental-shaped cup-like molds in said ornamental-shaped cup portions.

5. The baked goods baking kit as described in claim 4, wherein each of said ornamental-shaped cup-like molds has bottom and side walls and is removably and centrally disposed in a respective said ornamental-shaped cup portion such that the baking batter fills in said ornamental-shaped cup portion about said ornamental-shaped cup-like mold thus forming a cavity in the baked goods.

6. A baked goods baking kit comprising:
a baking member having a main wall and also having a plurality of ornamental-shaped cup portions being spacedly disposed in said main wall and being adapted to hold baking batter therein, said baking member further having holes being centrally disposed in said main wall; and
a baking mold tool being detachably attached to said baking member for forming selected shapes in the baked goods upon the baking batter being baked in said ornamental-shaped cup portions of said baking member, said baking mold tool including a frame, and also including ornamental-shaped cup-like molds being attached to said frame, and further including a handle being attached to said frame, and also including connectors being attached to said frame for holding said baking mold tool to said baking member, said frame including elongate mold support members, and also including an elongate cross member interconnecting said elongate mold support members, said each of said elongate mold support members having angled end portions to which respective said ornamental-shaped cup-like molds are attached, said handle having an arcuate shape and having end portions which are disposed through a top side of said elongate cross member, said connectors being peg-like members extending from ends of said end portions of said handle and being removably disposed in said holes of said baking member to hold said baking mold tool to said baking member and to secure said ornamental-shaped cup-like molds in said ornamental-shaped cup portions, each of said ornamental-shaped cup-like molds having bottom and side walls and being removably and centrally disposed in a respective said ornamental-shaped cup portion such that the baking batter fills in said ornamental-shaped cup portion about said ornamental-shaped cup-like mold thus forming a cavity in the baked goods.

* * * * *